United States Patent
Beaudette et al.

(10) Patent No.: US 8,355,332 B2
(45) Date of Patent: Jan. 15, 2013

(54) ETHERNET SERVICE TESTING AND VERIFICATION

(75) Inventors: Allan Beaudette, Ottawa (CA); Ken Young, Kanata (CA); Brian Smith, Ottawa (CA); Natalie Giroux, Ottawa (CA)

(73) Assignee: Ciena Corporation, Hanover, MD (US)

( * ) Notice: Subject to any disclaimer, the term of this patent is extended or adjusted under 35 U.S.C. 154(b) by 651 days.

(21) Appl. No.: 12/002,465

(22) Filed: Dec. 17, 2007

(65) Prior Publication Data

US 2009/0157353 A1 Jun. 18, 2009

(51) Int. Cl.
*G01R 31/08* (2006.01)
(52) U.S. Cl. ........................................ 370/248
(58) Field of Classification Search .......... 370/241–253; 702/179–195
See application file for complete search history.

(56) References Cited

U.S. PATENT DOCUMENTS

| | | | |
|---|---|---|---|
| 6,904,286 B1 | 6/2005 | Dantu | |
| 7,646,778 B2 * | 1/2010 | Sajassi | 370/401 |
| 2004/0170179 A1 | 9/2004 | Johansson et al. | |
| 2004/0170186 A1 | 9/2004 | Shao et al. | |
| 2005/0195753 A1 * | 9/2005 | Chaskar et al. | 370/254 |
| 2006/0251074 A1 * | 11/2006 | Solomon | 370/392 |
| 2008/0031129 A1 * | 2/2008 | Arseneault et al. | 370/218 |
| 2008/0259930 A1 * | 10/2008 | Johnston et al. | 370/395.2 |

FOREIGN PATENT DOCUMENTS

| | | |
|---|---|---|
| EP | 1124356 A2 | 8/2001 |
| WO | WO 2004057817 A2 | 7/2004 |

* cited by examiner

*Primary Examiner* — Mark Rinehart
*Assistant Examiner* — Mang Yeung
(74) *Attorney, Agent, or Firm* — Clements Bernard PLLC; Christopher L. Bernard; Lawrence A. Baratta, Jr.

(57) ABSTRACT

A method of testing a service connection within a container in an Ethernet network comprises coupling a test device to a port on a node in a path that includes the container, switching traffic of the service connection to the port, measuring selected parameters of the switched traffic in the test device, and using the measured parameters to evaluate the performance of the service connection. In one implementation, the switching uses service and container identifications, and switching the traffic to the test device is based on the service and container identifications. The test device may be capable of inserting traffic within the service connection, and the container may be a tunnel.

9 Claims, 6 Drawing Sheets

ETHERNET SERVICE TESTING AND VERIFICATION

FIELD OF THE INVENTION

The present invention generally relates to a method of testing Ethernet services.

BACKGROUND OF THE INVENTION

Ethernet transport is an emerging opportunity for telecommunication carriers. The Ethernet transport network structure offers the potential to carry and deliver Ethernet connectivity with different types of services having many combinations of quality objectives, such as loss, delay and bandwidth. The Ethernet technology is undergoing a significant transformation to bring it to a level that is carrier-grade with the required management and protection functionality.

When a telecommunications provider offers an Ethernet service, a service level agreement (SLA) is entered which defines the service performance requirement for the network connection. The SLA may include different Quality of Service parameters (e.g. loss, delay, delay variation, bit error rate, availability). When services are established, the service provider needs to ensure that the path selected for the service will meet the SLA. With legacy technologies, such as Time Division Multiplexing (TDM), the network had the capability to perform a split/monitor function on a given connection/service before it is activated for service. Test devices located in the network allowed the service provider to both monitor the service/circuit and place the service/circuit under test.

With Ethernet, this capability does not exist. A technician needs to travel to the customer location to connect a testing device at the location where the service is to be created, or a Network Interface Demarcation device (NID) is permanently installed. The testing device generates the test traffic to different loop back points in the network and measurements are taken over a period of time. When the measurements are completed, the technician returns to site and removes the testing device before activating the service. This process is very costly and labor intensive as it requires manpower along with large quantities of testing devices. It also significantly increases the time required to put a connection in service, thus directly affecting the service provider's financial performance.

SUMMARY OF THE INVENTION

In one embodiment, a method of testing a service connection within a container in an Ethernet network comprises coupling a test device to a port on a node in a path that includes the container, switching traffic of the service connection to the port, measuring selected parameters of the switched traffic in the test device, and using the measured parameters to evaluate the performance of the service connection. In one implementation, the switching uses service and container identifications, and switching the traffic to the test device is based on the service and container identifications. The test device may be capable of inserting traffic within the service connection, and the container may be a tunnel.

In another embodiment, a method of testing a container within in an Ethernet network comprises provisioning the container on a path in the network, coupling a test device to a port on a node in the container's path, creating a test connection to the container, injecting traffic from the test device into the test connection, switching traffic of the test connection to the test device, measuring selected parameters of the injected traffic in the test device, and using the measured parameters to evaluate the performance of the container. The test connection may be removed after the measuring is completed, and the measuring of selected parameters may be effected by the test device. The container may be a tunnel.

BRIEF DESCRIPTION OF THE DRAWINGS

The invention will be better understood from the following description of preferred embodiments together with reference to the accompanying drawings, in which.

DETAILED DESCRIPTION

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

The Ethernet technology is undergoing a significant transformation to bring it to a level that is carrier-grade with the required management and protection functionality.

One proposed architecture for Carrier-Ethernet is based on the connection-oriented Provider Backbone Transport (PBT) or Provider Backbone Bridging-Traffic Engineered (PBB-TE) technology. PBT uses tunnels to create static paths to transport services between two points in the network. Packets are merged into the tunnel using a customer service identification field in the header (I-SID) combined with a tunnel identifier (B-VLAN) which identifies the first node where the tunnel originates. The tunnel can be generically described as a container with a Container ID which contains zero or more connections carrying a service under a Connection ID. This invention applies to any container-based technologies (e.g., pseudowires/MPLS-TE or PBB).

Figure 1:
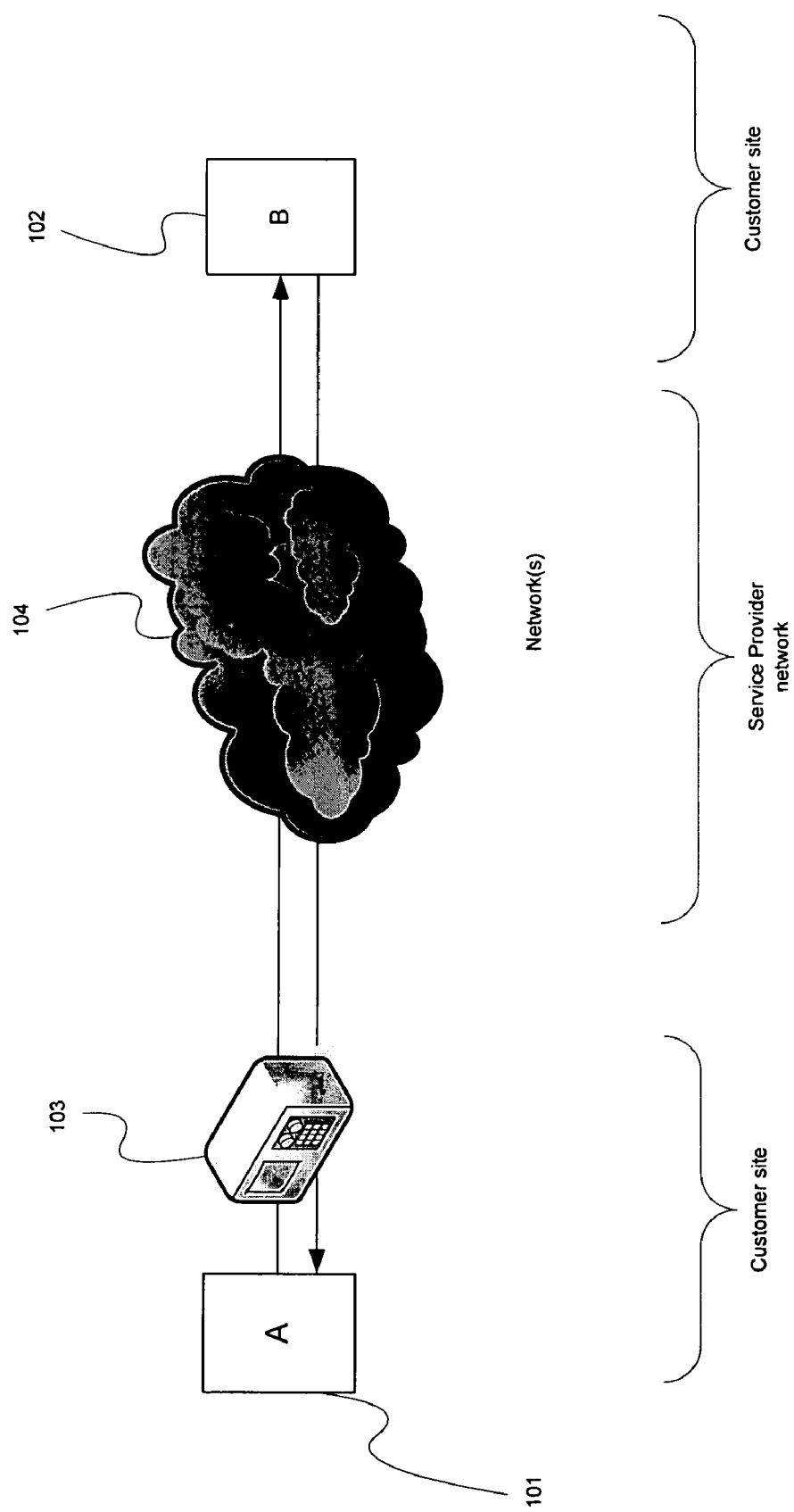
FIG. 1 is a diagram of a prior-art system with a test device in a customer site.

FIG. 1 depicts a service connection between two customer sites 101 and 102, using at least one network 104. A test device 103 is coupled to the service connection at the customer site 103 to allow the service provider to both monitor the service/circuit and place the service/circuit under test.

Figure 2:
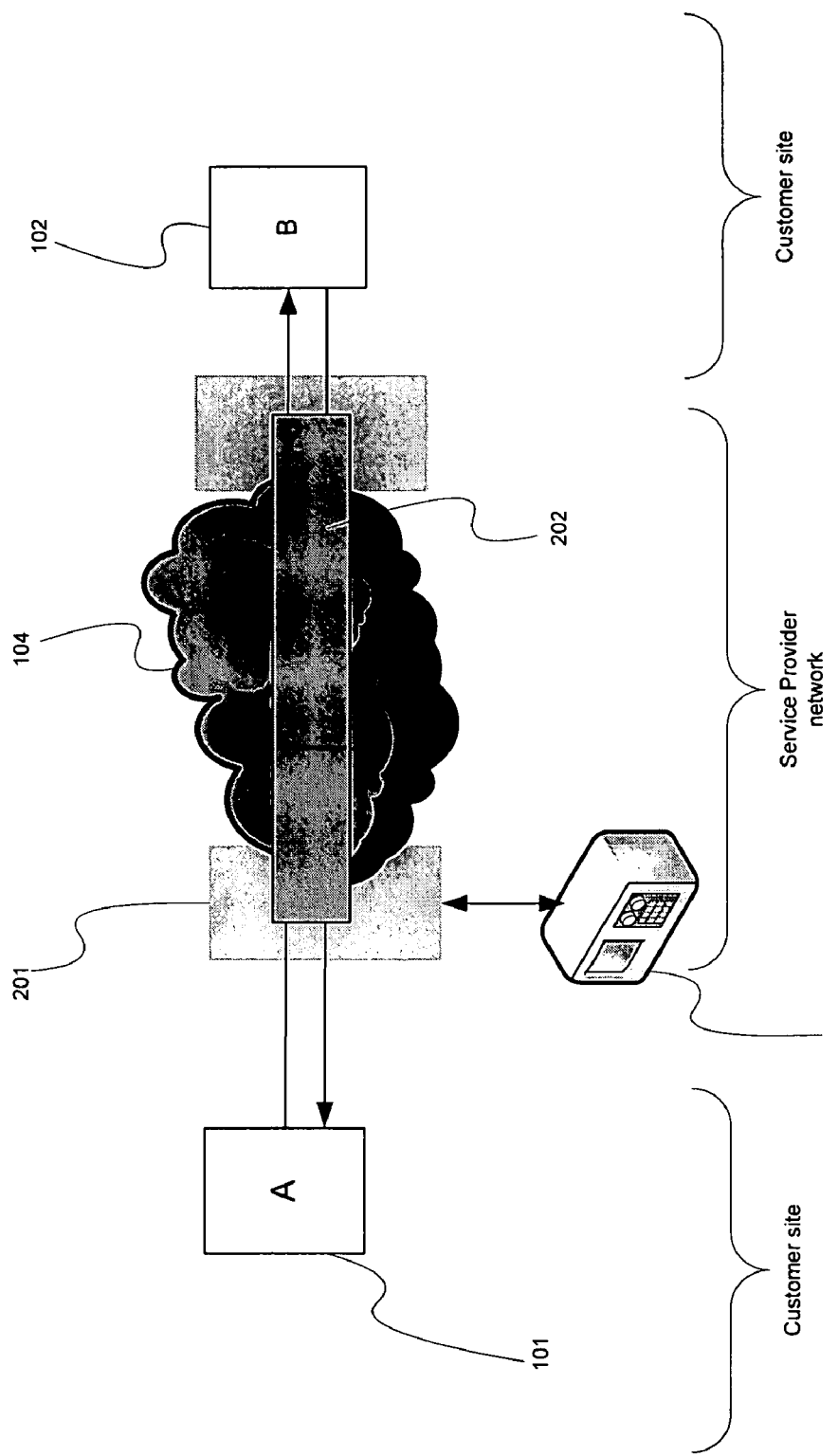
FIG. 2 is a diagram of an Ethernet service connection that includes a hosting node with a test device and a container.

Referring to FIG. 2, one or more containers 202 are created through the network to carry services. The access (or edge) node 201 where the container 202 originates only performs switching using the Container ID, as do the rest of the nodes in the path followed by the container. Currently, the only way to test a service, when it is configured, is by inserting a test device at the customer location as discussed above. Test devices can be located at different nodes within the network. The nodes hosting a test device, such as the hosting node 201, are augmented with the capability of configuring switching either at the container ID or at the connection ID plus Container ID level. The hosting node 201 is then capable of inserting a split or monitor function on a single service within a defined tunnel, where the service is created, to test its performance before activation.

Figure 3:
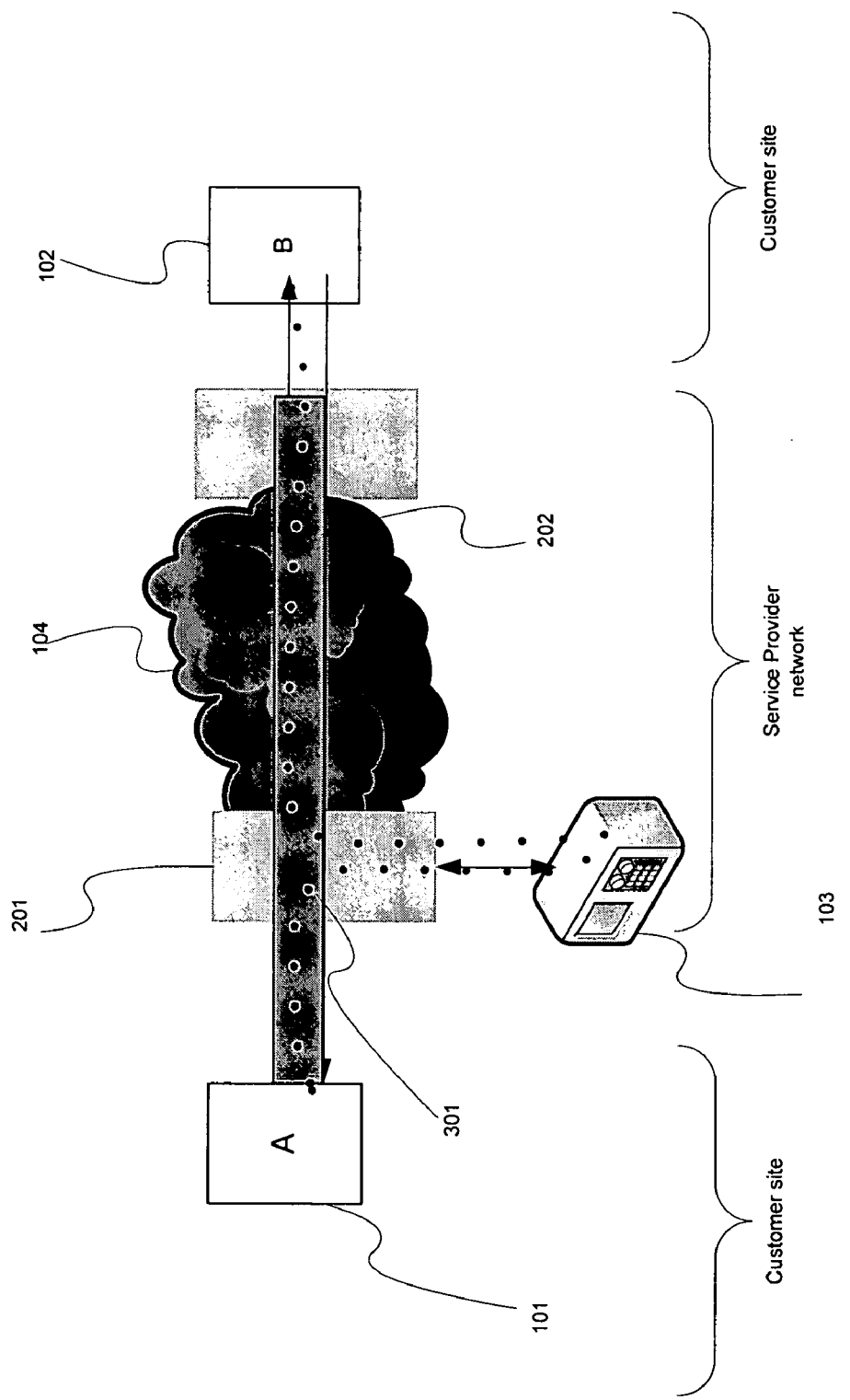
FIG. 3 is a diagram depicting a split testing function in the service connection depicted in FIG. 2.

In the split case (FIG. 3), the hosting node 201 is configured to switch 301 all the packets for this service, based on the combination of the connection ID and the Container ID, to two defined ports on the hosting node interfaces where the test unit is located. The switching of the rest of the activated services continues to be based on the Container ID.

Figure 4:
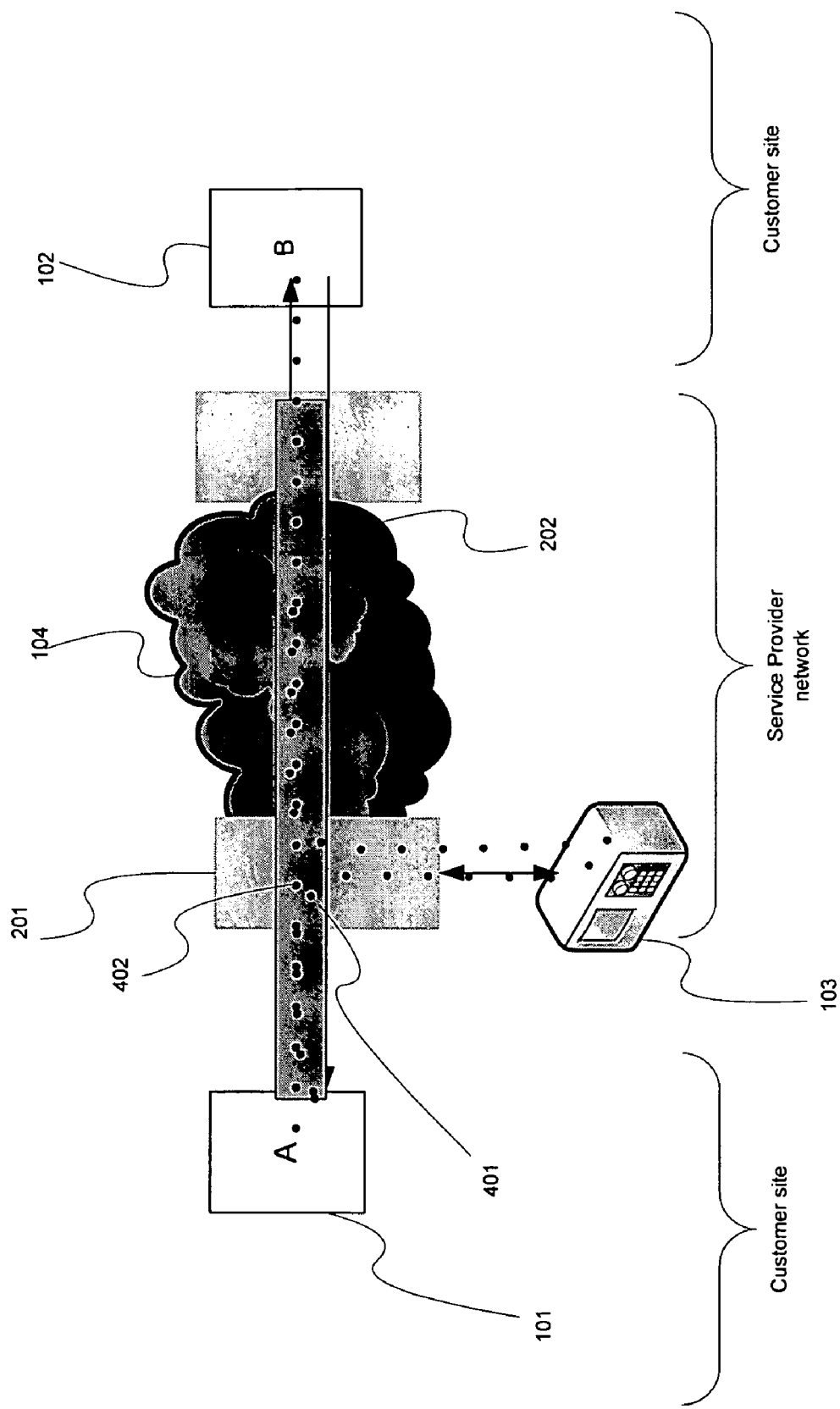
FIG. 4 is a diagram depicting a monitor testing function in the service connection depicted in FIG. 2.

In the monitor case (FIG. 4), the hosting node 201 is configured to replicate the packets from the Connection ID 402 and then switch the replica of the traffic to the port where the test unit 401 is located.

In the split case, the test unit can insert different traffic patterns on both sides of the connection to measure the performance.

In the monitor case, the replicated data is supplied to the ports that have access to the test equipment that monitors the performance of the traffic traversing over the specific service.

Figure 5:
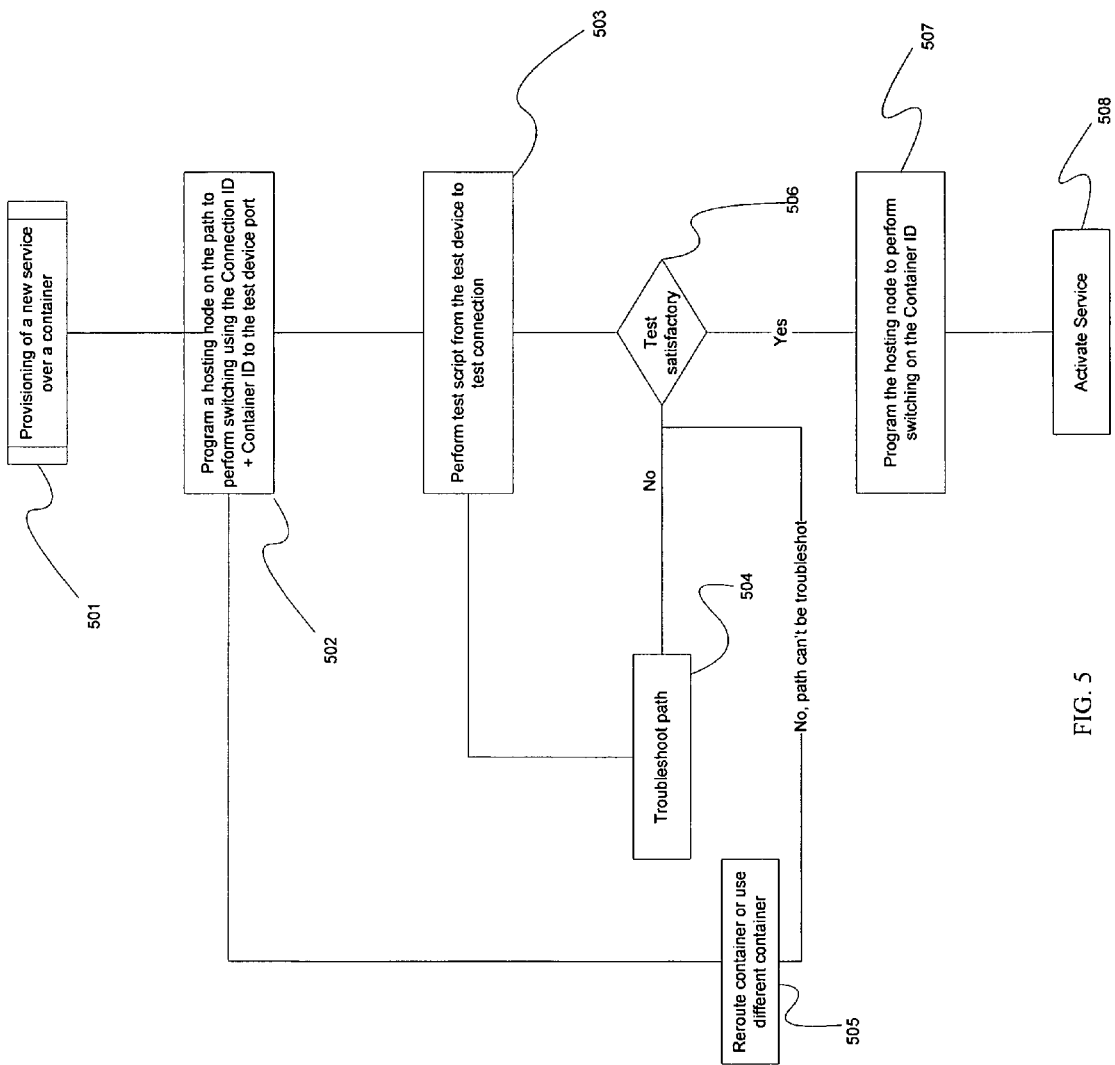
FIG. 5 is a flow chart of a procedure for the activation of a service.

FIG. 5 is a flow chart of the steps used to activate a service, in one embodiment. When a new service is provisioned over an existing container at step 501, the provisioning system (manual or network management system) programs a hosting node on the path of the container to perform switching (split) or monitoring using the Connection ID and Container ID for the new service, such that the traffic for the service is switched to the port with the testing device 502. Test scripts are performed at step 503 using the test device 103, and if the tests are not satisfactory, troubleshooting is performed on the path at step 504. If the path cannot be successfully troubleshot, then the service is provisioned over a different container, or the container itself is moved to a different path at step 505.

The testing continues until the performance metrics are determined to be satisfactory at step 506, at which point the hosting node resumes switching the tested connection, using only the container ID, at step 507. The service is then be activated to carry customer data at step 508.

Figure 6:
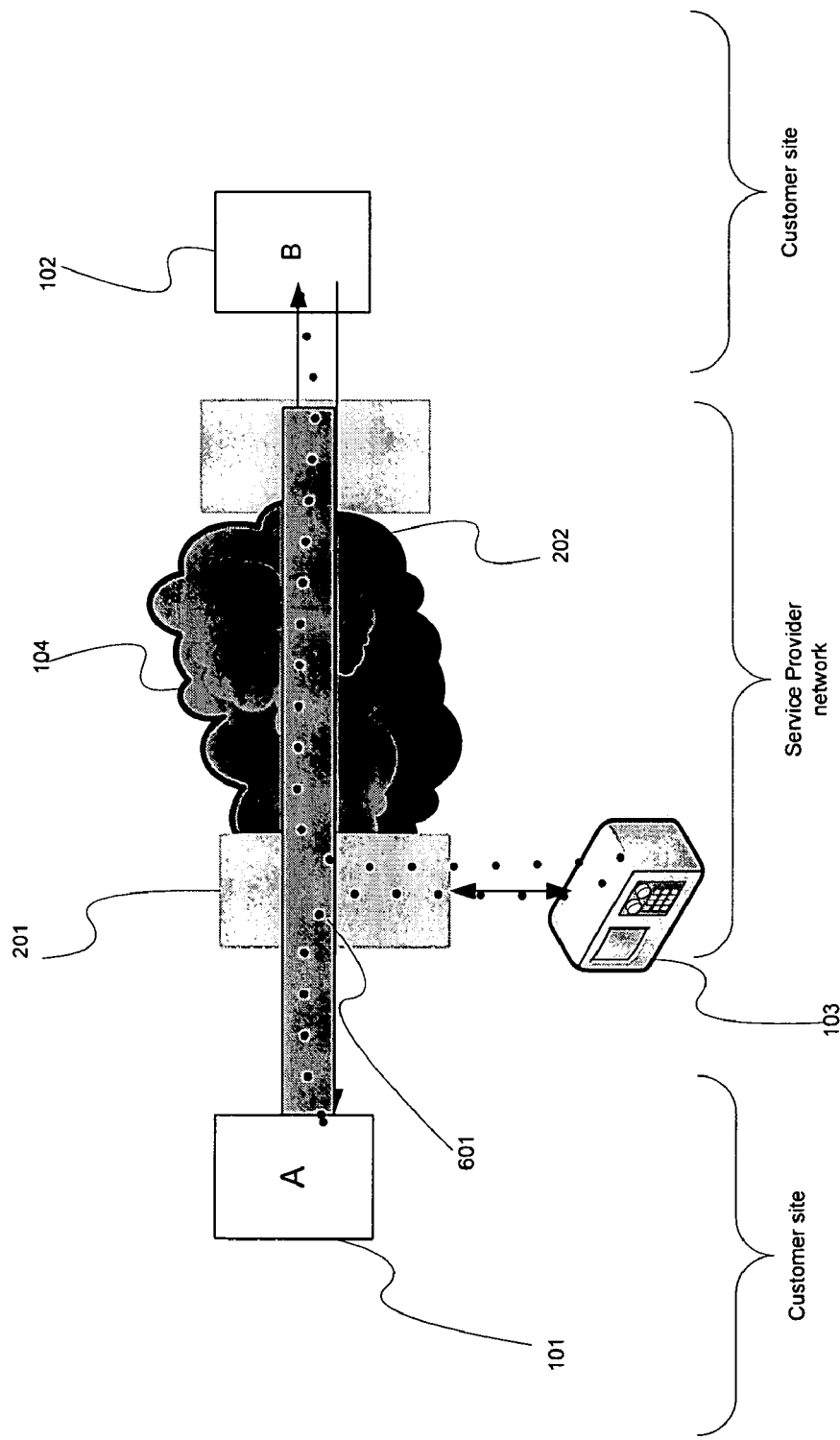
FIG. 6 is a diagram depicting a split testing arrangement for testing the quality of a container when it is set up before customer connections are provisioned on it.

The invention can also be used to test the quality of a container when it is set up before any customer connections are provisioned on it. Referring to FIG. 6, once the path of the container 202 is established and provisioned, a test connection 601 can be created and switched to the test device using the connection ID and container ID. The test device can insert traffic in either direction of the path to measure the performance. Once the tests are completed, the test connection can be removed, and the container 202 is ready to receive customer services. Alternatively, the test connection can remain active to perform periodic tests of the tunnel performance while the other customer service connections are active.

Using this capability, any number of testing devices can be located anywhere in the network to allow completely automated testing of new services, without requiring that a technician be sent to the customer premises to perform the verification or that expensive NID be installed at a customer location.

Those skilled in the art will recognize that various modifications and changes could be made to the invention without departing from the spirit and scope thereof. It should therefore be understood that the claims are not to be considered as being limited to the precise embodiments set forth above, in the absence of specific limitations directed to each embodiment.

What is claimed is:

1. A method of testing a service connection within a container in an Ethernet network, comprising
    coupling a test device to a port on a node in a path that includes said container,
    switching traffic of said service connection to said port,
    measuring selected parameters of said switched traffic in said test device, and
    using said measured parameters to evaluate the performance of said service connection,
    wherein one of a split mode and a monitor mode is utilized, the split mode comprising switching traffic of said service connection to said port based on a combination of a service identification and a container identification, the monitor mode comprising replicating and switching traffic of said service connection to said port based on said service identification, and
    wherein said service identification and container identification comprise Provider Backbone Bridging or Multiprotocol Label Switching/pseudowire identifications, wherein said container identification is a Backbone Virtual Local Area Network identifier and said service identification is a Service Instance Virtual Local Area Network identifier.

2. The method of claim 1 in which said test device is capable of inserting traffic within said service connection.

3. The method of claim 1 which includes creating a copy of said traffic and only switching said copy to the port of said test device.

4. The method of claim 1 in which said container is a tunnel.

5. A method of testing a container within in an Ethernet network, comprising
    provisioning the container on a path in the network,
    coupling a test device to a port on a node in said container's path,
    creating a test connection to said container,
    injecting traffic from said test device into said test connection,
    switching traffic of said test connection to said test device,
    measuring selected parameters of said injected traffic in said test device, and
    using said measured parameters to evaluate the performance of said container,
    wherein one of a split mode and a monitor mode is utilized, the split mode comprising switching traffic of said test connection to said test device based on a combination of a service identification and a container identification, the monitor mode comprising replicating and switching traffic of said test connection to said test device based on said service identification, and
    wherein said service identification and container identification comprise Provider Backbone Bridging identifications, wherein said container identification is a Backbone Virtual Local Area Network identifier and said service identification is a Service Instance Virtual Local Area Network identifier.

6. The method of claim 5 wherein said test connection is removed after said measuring is completed.

7. The method of claim 5 in which said measuring of selected parameters is affected by said test device.

8. The method of claim 5 in which said container is a tunnel.

9. A carrier Ethernet having at least one service connection within a container, comprising
    a source of traffic coupled to said service connection,
    a test device coupled to a node in a path that includes said container for measuring selected parameters of said traffic, a switch capable of selectively switching, based on a service identification and a container identification, to direct traffic to said node to which said test device is coupled, and a processor for receiving data from said test device and evaluating the performance of said service connection based on said measured selected parameters, wherein one of a split mode and a monitor mode is utilized, the split mode comprising switching said traffic to said node to which said test device is coupled based on a combination of said service identification and said container identification, the monitor mode comprising replicating and switching said traffic to said node to which said test device is coupled based on said service identification, and wherein said service identification and container identification comprise Provider Backbone Bridging identifications, wherein said container identification is a Backbone Virtual Local Area Network identifier and said service identification is a Service Instance Virtual Local Area Network identifier.

* * * * *